United States Patent
Doi et al.

(10) Patent No.: US 8,509,591 B2
(45) Date of Patent: Aug. 13, 2013

(54) TRANSMISSION APPARATUS, RECEPTION APPARATUS, AND TRANSMISSION METHOD

(75) Inventors: Takashi Doi, Fuchu (JP); Kazumi Tomioka, Yokohama (JP); Akiyoshi Kato, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 8 days.

(21) Appl. No.: 13/366,173

(22) Filed: Feb. 3, 2012

(65) Prior Publication Data
US 2012/0274858 A1    Nov. 1, 2012

(30) Foreign Application Priority Data

Apr. 27, 2011  (JP) .................................. 2011-099740

(51) Int. Cl.
*H04N 5/775* (2006.01)
*G06F 13/14* (2006.01)
*G06F 3/00* (2006.01)

(52) U.S. Cl.
USPC ................ 386/230; 386/231; 710/11; 710/16

(58) Field of Classification Search
USPC ................ 348/723, 725, 552, 558, 705, 706;
382/230, 231; 710/8, 10, 11, 14–19, 33,
710/38, 62, 72, 73; 725/151–153
See application file for complete search history.

(56) References Cited

U.S. PATENT DOCUMENTS

| | | | |
|---|---|---|---|
| 7,996,869 B2 * | 8/2011 | Tu et al. ........................ | 725/80 |
| 2010/0129062 A1 * | 5/2010 | Nakajima et al. ............. | 386/109 |
| 2010/0132004 A1 | 5/2010 | Ota et al. | |
| 2010/0329339 A1 | 12/2010 | Kanagawa | |
| 2011/0271296 A1 * | 11/2011 | Tu et al. ........................ | 725/25 |

FOREIGN PATENT DOCUMENTS

| | | |
|---|---|---|
| JP | 2008-077812 A | 4/2008 |
| JP | 3147725 U | 12/2008 |
| JP | 2009-177348 A | 8/2009 |
| JP | 2009-294797 A | 12/2009 |
| JP | 2010-278969 A | 12/2010 |
| JP | 2011-030179 A | 2/2011 |

* cited by examiner

*Primary Examiner* — Victor Kostak
(74) *Attorney, Agent, or Firm* — Knobbe Martens Olson & Bear, LLP

(57) ABSTRACT

According to one embodiment, a transmission apparatus includes a transmission module, a controller, a signal transmission module, and a selection module. The transmission module is configured to output a video signal or an audio signal to a TMDS line of an HDMI cable in a form based on the HDMI standard. The controller is configured to input/output an HEAC signal of the HDMI standard. The signal transmission module is configured to perform signal transmission based on a method other than the HDMI standard. The selection module is configured to selectively switch the HEAC line of the HDMI cable to either a state used for transmission of the HEAC signal that is input/output to/from the controller or a state used for transmission of a signal that is input/output to/from the signal transmission module.

9 Claims, 7 Drawing Sheets

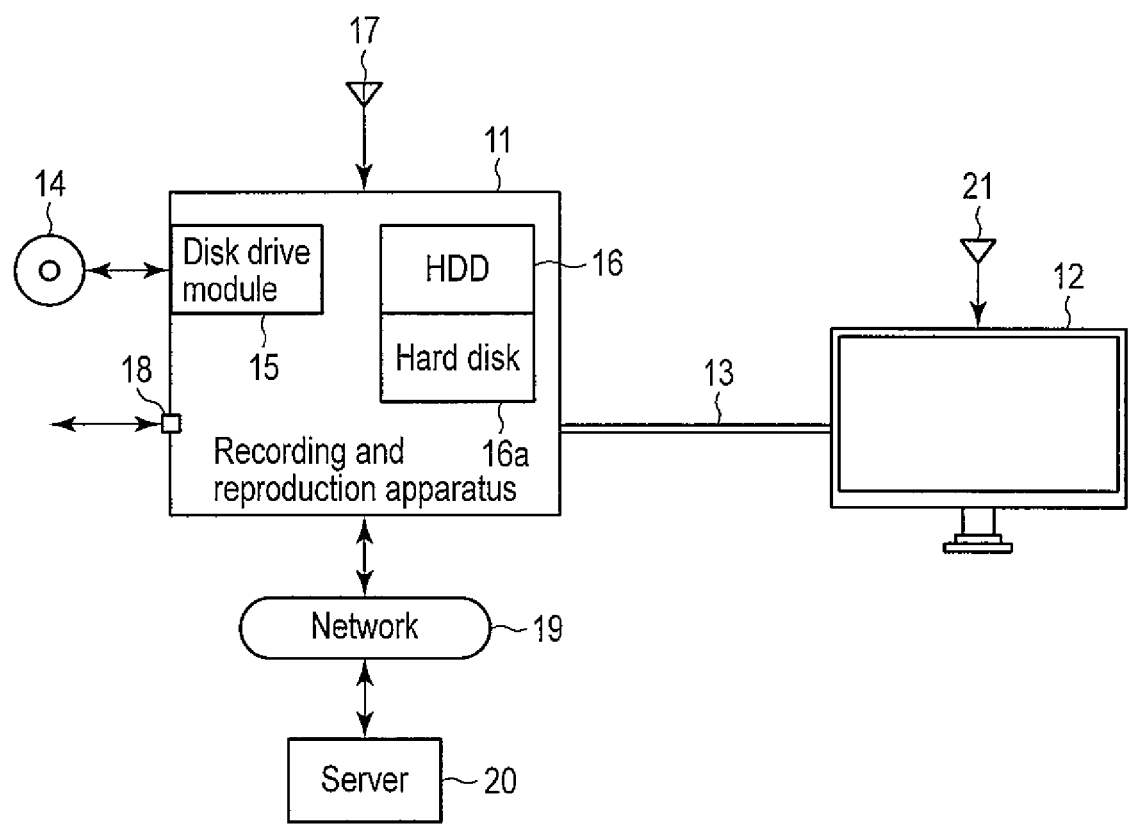
F I G. 1

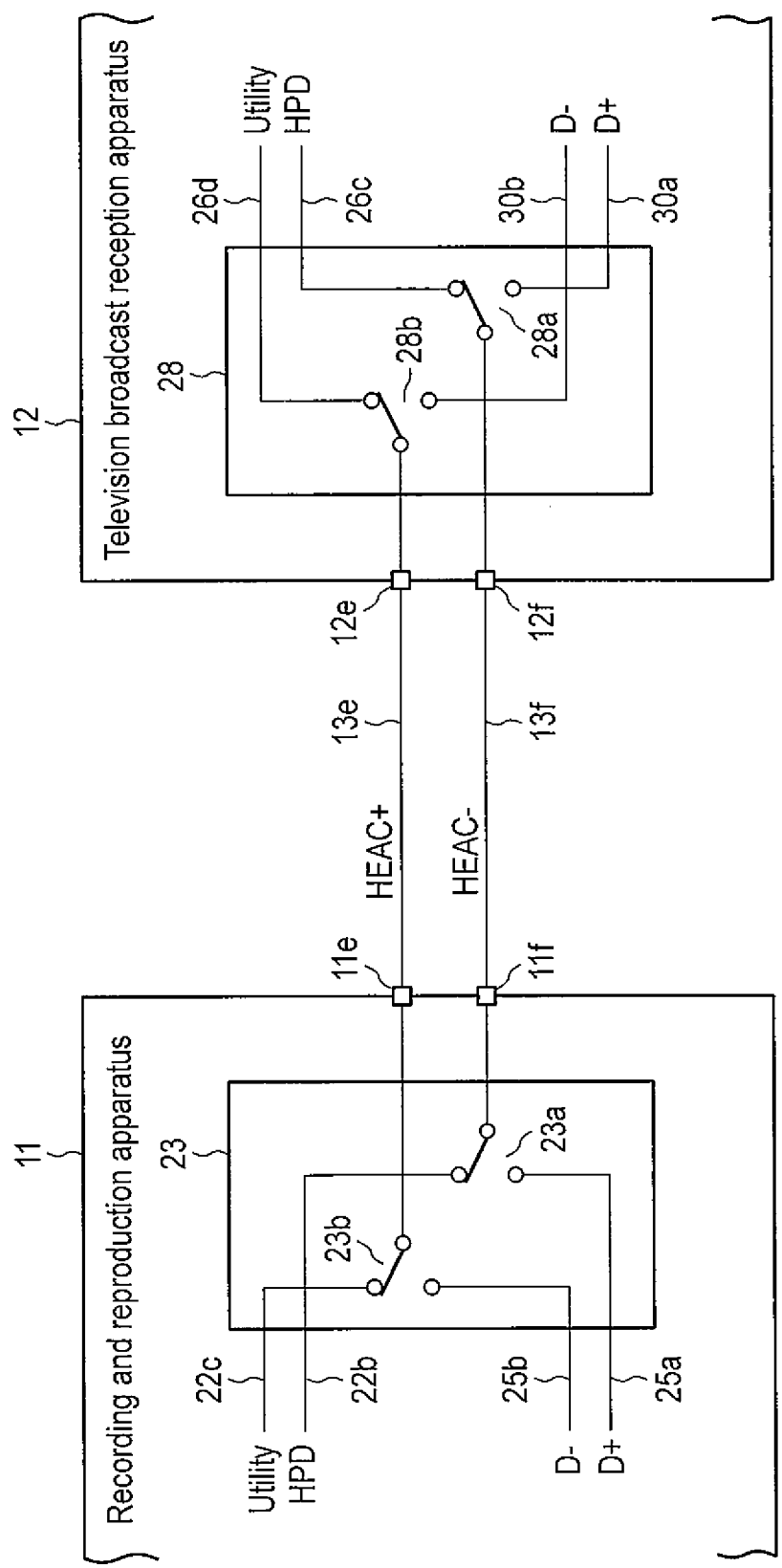
F I G. 3

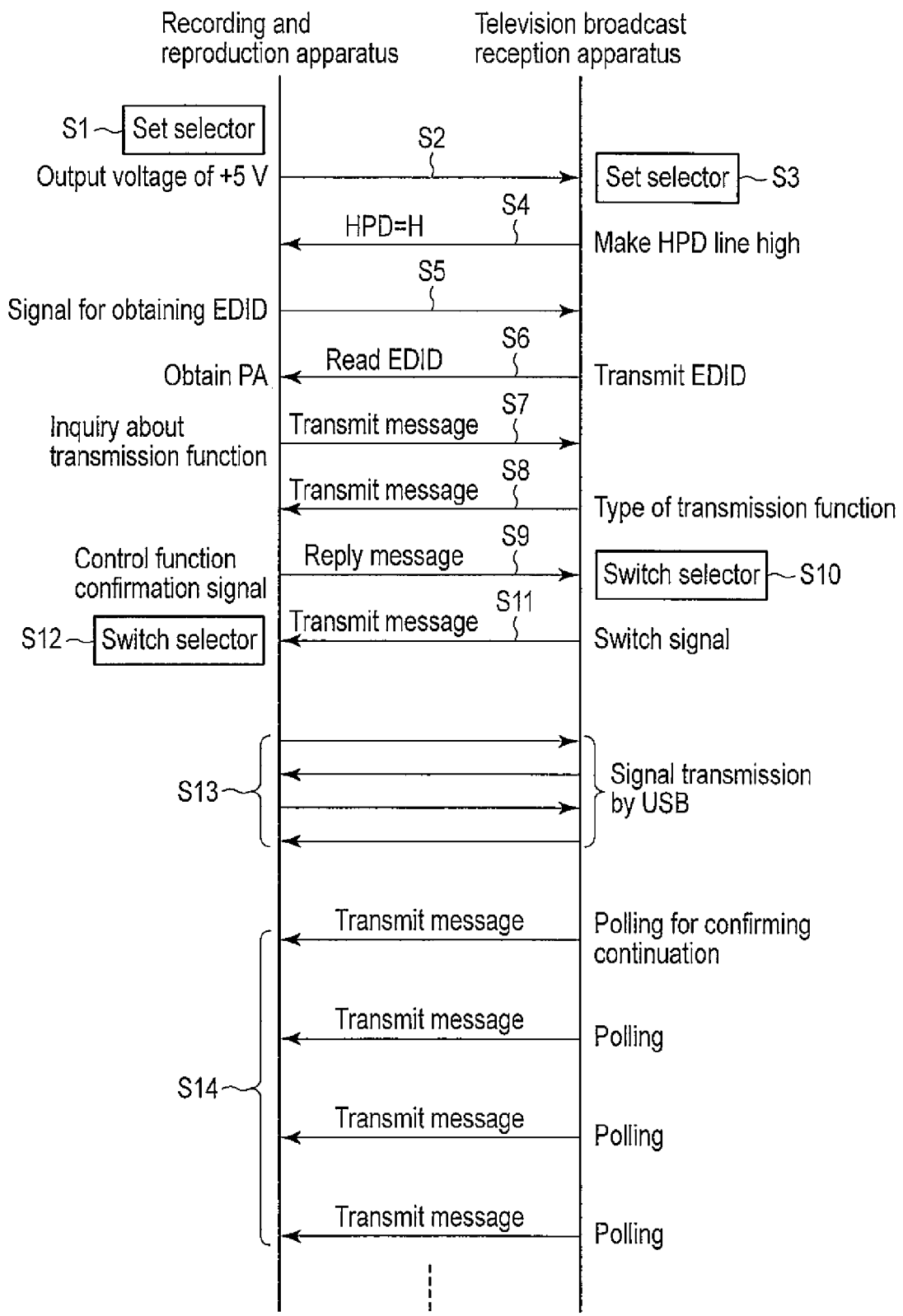
F I G. 4

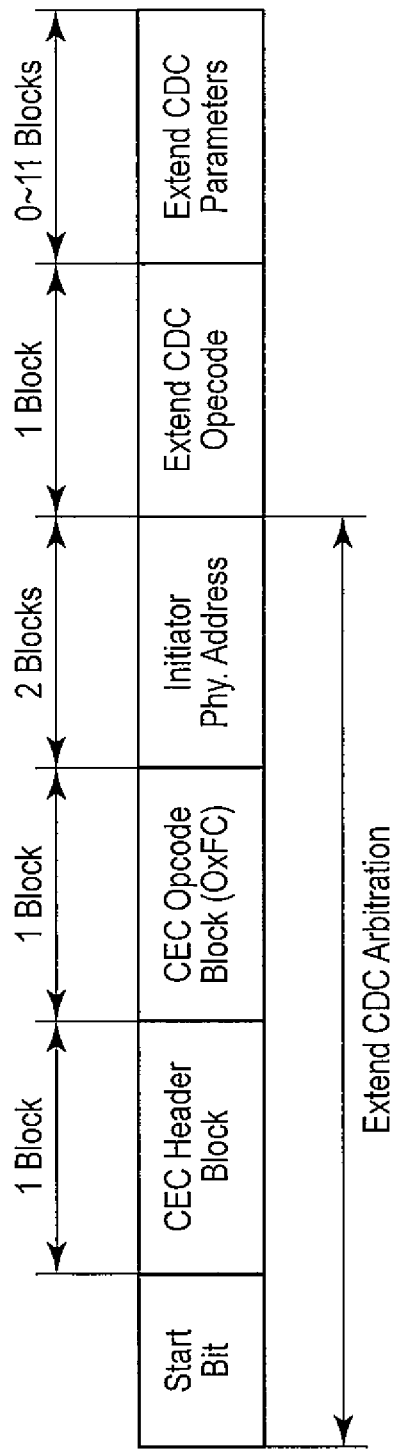
F I G. 7

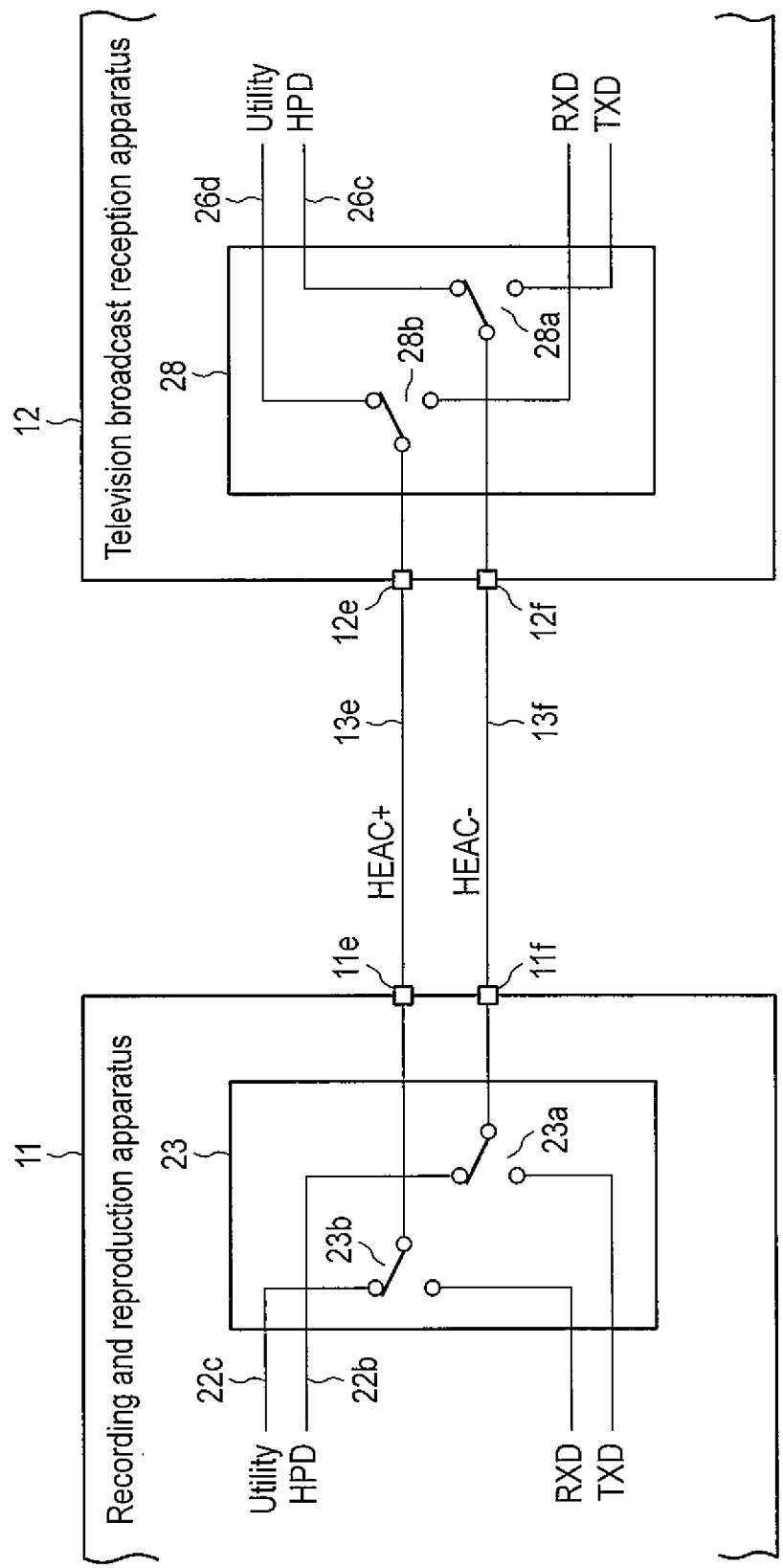
F I G. 8

TRANSMISSION APPARATUS, RECEPTION APPARATUS, AND TRANSMISSION METHOD

CROSS-REFERENCE TO RELATED APPLICATIONS

This application is based upon and claims the benefit of priority from prior Japanese Patent Application No. 2011-099740, filed Apr. 27, 2011, the entire contents of which are incorporated herein by reference.

FIELD

Embodiments described herein relate generally to a transmission apparatus, a reception apparatus, and a method for transmitting a digital video signal, a digital audio signal, and the like.

BACKGROUND

As is well known, the Digital Visual Interface (DVI) standard has come into wide use as the standard for transmitting a digital video signal. In recent years, the High-Definition Multimedia Interface (HDMI) standard has been employed as a digital signal transmission standard that further improves on the foregoing DVI standard.

The HDMI standard includes the following various stipulations, which are not defined in the DVI standard. For example, a digital audio signal can be multiplexed for a blanking interval of a digital video signal to perform audio transmission. The digital video signal is transmitted in an RGB signal format. In addition, the digital video signal can be transmitted in a YCbCr signal formal or in a higher quality YPbPr format. Connection is possible using a compact HDMI connector similar to a Universal Serial Bus (USB) connector.

In addition, according to the HDMI standard, authentication may be conducted between a transmitting device and a receiving device prior to transmitting a signal, so that the transmitting device can output the signal in a form suitable for performance of a receiving device. In this case, the transmitting device acquires extended display identification data (EDID) from the receiving device, thereby recognizing a receiving specification of the receiving device, and outputs the signal in a form suitable for the receiving specification.

As described above, signal transmission methods based on the HDMI standard are widely available in the market, but in general, transmission methods based on the USB standard are widely employed as a signal transmission between, for example, a personal computer (PC) and a peripheral device thereof. Therefore, one solution is to incorporate the signal transmission functions of both of the HDMI standard and the USB standard into a device, but in such case, it is cumbersome for the user to operate the device. Moreover, the number of connected cables increases, and the size of area in which the connectors are implemented increases.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block configuration diagram shown to schematically explain an example of a signal transmission system according to an embodiment.

FIG. 3 is a block configuration diagram shown to explain an example of signal switching at each selector of the recording and reproduction apparatus and the television broadcast reception apparatus according to the embodiment.

FIG. 4 is a flowchart shown to explain an example of main processing operation of the signal transmission system according to the embodiment.

FIG. 7 is a figure illustrating an example of frame configuration of an extended CDC signal transmitted by the signal transmission system according to the embodiment.

FIG. 8 is a block configuration diagram shown to explain another example of signal switching at each selector of the recording and reproduction apparatus and the television broadcast reception apparatus according to the embodiment.

DETAILED DESCRIPTION

Figure 2:
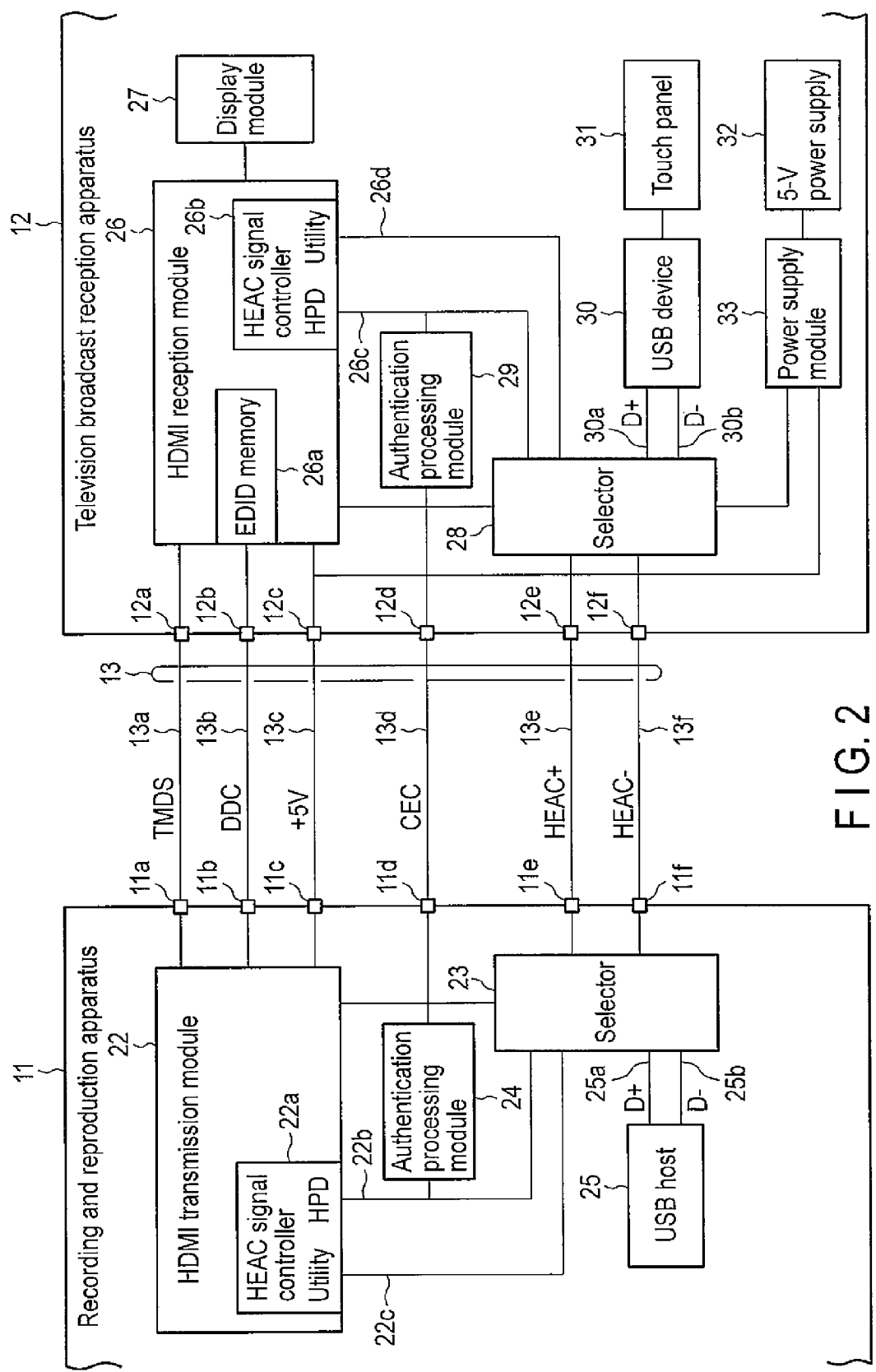
FIG. 2 is a block configuration diagram shown to explain an example of an essential portion of a recording and reproduction apparatus and a television broadcast reception apparatus constituting the signal transmission system according to the embodiment.

Various embodiments will be described hereinafter with reference to the accompanying drawings.

In general, according to one embodiment, a transmission apparatus comprises a transmission module, a controller, a signal transmission module, and a selection module. The transmission module is configured to output a video signal or an audio signal to a TMDS line of an HDMI cable in a form based on the HDMI standard. The controller is configured to input/output an HEAC signal of the HDMI standard. The signal transmission module is configured to perform signal transmission based on a method other than the HDMI standard. The selection module is configured to selectively switch the HEAC line of the HDMI cable to either a state used for transmission of the HEAC signal that is input/output to/from the controller or a state used for transmission of a signal that is input/output to/from the signal transmission module.

FIG. 1 schematically illustrates an example of a signal transmission system explained in this embodiment. In this signal transmission system, a signal transmitting apparatus, i.e., a recording and reproduction apparatus 11 serving as a source apparatus, and a signal receiving apparatus, i.e., a television broadcast reception apparatus 12 serving as a sink apparatus, are connected to allow signal transmission according to a method based on HDMI 1.4 standard using an HDMI cable 13.

Among them, the recording and reproduction apparatus 11 has a disk drive module 15 and a hard disc drive (HDD) 16. An optical disk 14 such as a Digital Versatile Disc (DVD) can be loaded in the disk drive module 15. In addition, the recording and reproduction apparatus 11 includes, for example, a function of receiving a broadcast signal using an antenna 17 and recovering a signal of video, audio, and the like, a function of receiving a signal of video, audio, and the like from the outside via an input/output terminal 18, and a function of obtaining a signal of video, audio, and the like from a server 20 that is accessed via a network 19.

This recording and reproduction apparatus 11 can record and reproduce a signal obtained from the antenna 17, the input/output terminal 18, the server 20, and the like to the optical disk 14 using the disk drive module 15, and can record and reproduce the signal on and from the hard disk 16a by means of the HDD 16. In addition, the recording and reproduction apparatus 11 can selectively output the signal obtained from the antenna 17 and the server 20 and the signal reproduced from the optical disk 14 and the hard disk 16a to the outside via the input/output terminal 18.

Further, the recording and reproduction apparatus 11 can selectively output the signal obtained from the antenna 17, the input/output terminal 18, the server 20, and the like and a signal reproduced from the optical disk 14 and the hard disk 16a to the television broadcast reception apparatus 12 via the HDMI cable 13 in a form based on the HDMI standard.

The television broadcast reception apparatus 12 includes, for example, a function of recovering a signal of video, audio, and the like from the broadcast signal received with the antenna 21 and displaying the video, reproducing the audio, and the like, and a function of displaying video, reproducing audio, and the like based on the signal of the video, the audio, and the like received via the HDMI cable 13.

Each of the recording and reproduction apparatus 11 and the television broadcast reception apparatus 12 has a signal transmission function based on the USB standard as a signal transmission method other than the HDMI standard, the details of which will be explained later. In this embodiment, using the same HDMI cable 13, the signal transmission based on the HDMI standard and the signal transmission based on the USB standard can be selectively realized between the recording and reproduction apparatus 11 and the television broadcast reception apparatus 12.

This enables signal transmission selectively supporting a plurality of types of signal transmission methods including the HDMI standard using the simple configuration without increasing the number of connected cables, the size of area in which the connectors are implemented, and the like, thus enhancing user convenience in handling the signal transmission.

FIG. 2 illustrates an example of an essential portion of the recording and reproduction apparatus 11, the television broadcast reception apparatus 12, and the HDMI cable 13. First, the recording and reproduction apparatus 11 has an HDMI transmission module 22 to which, for example, the signal obtained from the antenna 17, the input/output terminal 18, the server 20, and the like, and the signal reproduced from the optical disk 14 and the hard disk 16a are selectively supplied.

The HDMI transmission module 22 includes a function of converting the received signal into a form based on the Transmission Minimized Differential Signaling (TMDS) method and outputting the converted signal to a TMDS line 13a of the HDMI cable 13 via a terminal 11a, a function of outputting the signal for obtaining an EDID from the television broadcast reception apparatus 12 to a Display Data Channel (DDC) line 13b of the HDMI cable 13 made of an Inter-Integrated Circuit ($I^2C$) via the terminal 11b, and a function of outputting a power supply voltage of +5 V to a +5 V power supply line 13c of the HDMI cable 13 via a terminal 11c.

The HDMI transmission module 22 includes an HDMI Ethernet (registered trademark) and Audio Return Channel (HEAC) signal control module 22a. The HEAC signal control module 22a uses a Hot-Plug Detect (HPD) line 22b and a Utility line 22c to input and output an HEAC signal. The HPD line 22b and the utility line 22c are connected to an input end of a selector 23.

Further, the HPD line 22b is connected to an authentication processing module 24. The authentication processing module 24 transmits a signal to a CEC line 13d of the HDMI cable 13 via a terminal 11d so as to transmit an inquiry to the television broadcast reception apparatus 12 to determine whether the television broadcast reception apparatus 12 supports any signal transmission function of a method other than the HDMI standard. The authentication processing module 24 also has a function of receiving a response signal from the television broadcast reception apparatus 12 in reply to the inquiry.

A D+ line 25a and a D- line 25b are connected to the other input end of the selector 23 so as to input/output a signal in a form based on the USB standard to/from a USB host 25. The selector 23 is controlled and selectively switched by the HDMI transmission module 22 into either an input/output state of a signal via the HPD line 22b and the Utility line 22c and an input/output state of a signal via the D+ line 25a and the D- line 25b.

When the selector 23 is switched to the input/output state of the signal via the HPD line 22b and the Utility line 22c, the Utility line 22c is connected to an HEAC+ line 13e of the HDMI cable 13 via a terminal 11e, and the HPD line 22b is connected to an HEAC- line 13f of the HDMI cable 13 via a terminal 11f.

When the selector 23 is switched to the input/output state of the signal via the D+ line 25a and the D- line 25b, the D- line 25b is connected to an HEAC+ line 13e of the HDMI cable 13 via the terminal 11e, and the D+ line 25a is connected to the HEAC- line 13f of the HDMI cable 13 via the terminal 11f.

On the other hand, the television broadcast reception apparatus 12 includes an HDMI reception module 26 to which the signal transmitted via the TMDS line 13a is supplied via a terminal 12a. The HDMI reception module 26 recovers the original signal of video, audio, and the like from the signal supplied via the TMDS line 13a, and provides the signal for video display on a display module 27 and audio reproduction by a speaker, not shown.

In addition, the HDMI reception module 26 has an EDID memory 26a. When the DDC line 13b supplies the signal for obtaining the EDID to the EDID memory 26a via the terminal 12b, the EDID stored in the EDID memory 26a is read, and the EDID is output via the terminal 12b to the DDC line 13b.

In addition, the +5 V power supply voltage supplied via the +5 V power supply line 13c is applied to the HDMI reception module 26 via the terminal 12c.

Further, the HDMI reception module 26 has an HEAC signal control module 26b. The HEAC signal control module 26b uses a HPD line 26c and a Utility line 26d to input/output the HEAC signal. The HPD line 26c and the Utility line 26d are connected to an input end of a selector 28.

The HPD line 26c is also connected to an authentication processing module 29. When the authentication processing module 29 receives, from the CEC line 13d, the inquiry about the transmission function supplied via a terminal 12d from the recording and reproduction apparatus 11, the authentication processing module 29 outputs a response signal in reply to the inquiry to the CEC line 13d via the terminal 12d.

A D+ line 30a and a D- line 30b are connected to the other input end of the selector 28 so as to input/output a signal in a form based on the USB standard to/from a USB device 30. The selector 28 is controlled and selectively switched by the HDMI reception module 26 into either an input/output state of a signal via the HPD line 26c and the Utility line 26d and an input/output state of a signal via the D+ line 30a and the D- line 30b.

When the selector 28 is switched to the input/output state of the signal via the HPD line 26c and the Utility line 26d, the Utility line 26d is connected to the HEAC+ line 13e of the HDMI cable 13 via a terminal 12e, and the HPD line 26c is connected to the HEAC− line 13f of the HDMI cable 13 via a terminal 12f.

When the selector 28 is switched to the input/output state of the signal via the D+ line 30a and the D− line 30b, the D− line 30b is connected to the HEAC+ line 13e of the HDMI cable 13 via the terminal 12e, and the D+ line 30a is connected to the HEAC− line 13f of the HDMI cable 13 via the terminal 12f.

It should be noted that a touch panel 31 for operation thereof is connected to the USB device 30. In addition, the television broadcast reception apparatus 12 has a power supply module 33 for supplying power supply voltages to respective modules requiring the voltages as necessary on the basis of the power supplied from the 5-V power supply 32.

FIG. 3 illustrates an example of specific configuration of the selector 23 provided in the recording and reproduction apparatus 11 and the selector 28 provided in the television broadcast reception apparatus 12. More specifically, the selector 23 includes a switch 23a and a switch 23b. The switch 23a performs a switching operation such that the HPD line 22b of the HEAC signal control module 22a and the D+ line 25a of the USB host 25 are selectively connected to the HEAC− line 13f of the HDMI cable 13. The switch 23b performs a switching operation such that the Utility line 22c of the HEAC signal control module 22a and the D− line 25b of the USB host 25 are selectively connected to the HEAC+ line 13e of the HDMI cable 13. These switches 23a, 23b are controlled by the HDMI transmission module 22 and are selectively switched together to either the state as shown in the drawing or the state opposite to that shown in the drawing.

On the other hand, the selector 28 includes a switch 28a and a switch 28b. The switch 28a performs a switching operation such that the HPD line 26c of the HEAC signal control module 26b and the D+ line 30a of the USB device 30 are selectively connected to the HEAC− line 13f of the HDMI cable 13. The switch 28b performs a switching operation such that the Utility line 26d of the HEAC signal control module 26b and the D− line 30b of the USB device 30 are selectively connected to the HEAC+ line 13e of the HDMI cable 13. These switches 28a, 28b are controlled by the HDMI reception module 26 and are selectively switched together to either the state as shown in the drawing or the state opposite to that shown in the drawing.

FIG. 4 is a flowchart summarizing main processing operation of the signal transmission system having the above configuration. First, when the main power supply of the recording and reproduction apparatus 11 is turned on, the HDMI transmission module 22 sets the selector 23 so that the selector 23 selects the HPD line 22b and the Utility line 22c of the HEAC signal control module 22a as shown in step S1.

When the recording and reproduction apparatus 11 and the television broadcast reception apparatus 12 are connected via the HDMI cable 13 in this setting state of the selector 23, the HDMI transmission module 22 outputs the power supply voltage of +5 V to the +5 V power supply line 13c of the HDMI cable 13 via the terminal 11c as shown in step S2.

When the television broadcast reception apparatus 12 receives, from the terminal 12c, the power supply voltage of +5 V supplied via the +5 V power supply line 13c, the HDMI reception module 26 of the television broadcast reception apparatus 12 sets the selector 23 so that the selector 23 selects the HPD line 26c and the Utility line 26d of the HEAC signal control module 26b as shown in step S3.

As a result, the recording and reproduction apparatus 11 and the television broadcast reception apparatus 12 are connected such that the HPD lines 22b, 26c thereof are commonly connected via the HEAC− line 13f of the HDMI cable 13, and the Utility lines 22c, 26d thereof are commonly connected via the HEAC+ line 13e of the HDMI cable 13.

The HDMI reception module 26 of the television broadcast reception apparatus 12 causes the HEAC signal control module 26b to make the HPD line 26c high as shown in step S4. The HEAC signal control module 22a as well as the HDMI transmission module 22 recognize that the HPD line 26c is high by way of the selector 28, the HEAC− line 13f, and the selector 23 of the recording and reproduction apparatus 11.

Then, the HDMI transmission module 22 accesses the EDID memory 26a by outputting the signal for obtaining the EDID to the DDC line 13b of the HDMI cable 13 as shown in step S5, and obtains a physical address (PA), i.e., device arrangement information written in the EDID, from the EDID memory 26a as shown in step S6. The HDMI transmission module 22 adopts the obtained PA as its own PA.

Subsequently, the HDMI transmission module 22 causes the authentication processing module 24 to output a signal to the CEC line 13d of the HDMI cable 13 so as to transmit an inquiry to the television broadcast reception apparatus 12 to determine whether the television broadcast reception apparatus 12 supports any signal transmission function of a method other than the HDMI standard as shown in step S7. The extended Capability Discovery and Control (CDC) signal is used as the signal for inquiry about the transmission function.

When the signal for inquiry about the transmission function is provided, the authentication processing module 29 of the television broadcast reception apparatus 12 outputs a response signal indicating the type of transmission function provided in the television broadcast reception apparatus 12 to the CEC line 13d of the HDMI cable 13 as shown in step S8. The extended CDC signal is also used as the response signal.

Then, the authentication processing module 24 of the recording and reproduction apparatus 11 analyzes the response signal provided by the authentication processing module 29 of the television broadcast reception apparatus 12, and when the transmission function is controllable, the authentication processing module 24 outputs a control function confirmation signal to the CEC line 13d as shown in step S9. When the transmission function is not controllable, no message is transmitted.

When the authentication processing module 29 of the television broadcast reception apparatus 12 receives the control function confirmation signal from the authentication processing module 24 of the recording and reproduction apparatus 11 via the CEC line 13d, the authentication processing module 29 transmits a notification of the reception of the control function confirmation signal to the HDMI reception module 26. Then, the HDMI reception module 26 switches the selector 28 to a state in which the D+ line 30a and the D− line 30b of the USB device 30 are selected as shown in step S10. Further, at this occasion, the power supply module 33 begins to supply the power to the USB device 30.

Then, when the selector 28 is switched, the authentication processing module 29 of the television broadcast reception apparatus 12 outputs a switch signal indicating the switching of the selector 28 to the authentication processing module 24 of the recording and reproduction apparatus 11 via the CEC line 13d as shown in step S11. Then, the authentication processing module 24 transmits, to the HDMI transmission module 22, a notification indicating that the switch signal is received. Therefore, the HDMI transmission module 22 switches the selector 23 to a state in which the D+ line 25a and the D− line 25b of the USB host 25 are selected as shown in step S12.

As a result, the recording and reproduction apparatus 11 and the television broadcast reception apparatus 12 are connected such that the D+ lines 25a, 30a thereof are commonly connected via the HEAC− line 13f of the HDMI cable 13, and the D− lines 25b, 30b thereof are commonly connected via the HEAC+ line 13e of the HDMI cable 13.

Therefore, as shown in step S13, using the HEAC+ line 13e and the HEAC− line 13f of the HDMI cable 13, the recording and reproduction apparatus 11 and the television broadcast reception apparatus 12 can transmit signals according to the method based on the USB standard.

While the signal transmission continues according to the method based on USB standard, the authentication processing module 29 of the television broadcast reception apparatus 12 transmits a message for confirming continuation (polling message) to the authentication processing module 24 of the recording and reproduction apparatus 11 via the CEC line 13d at a regular interval (for example, every 60 seconds) as shown in step S14. The recording and reproduction apparatus 11 maintains the selector 23 in the USB connection state until the polling is lost.

It should be noted that the response signal indicating the type of transmission function provided in the television broadcast reception apparatus 12 transmitted in step S8 explained above may include not only information indicating the signal transmission means based on the USB standard, i.e., information indicating the presence of the USB device 30, but also information indicating signal transmission speed and the like of the USB device 30.

Figure 5A:
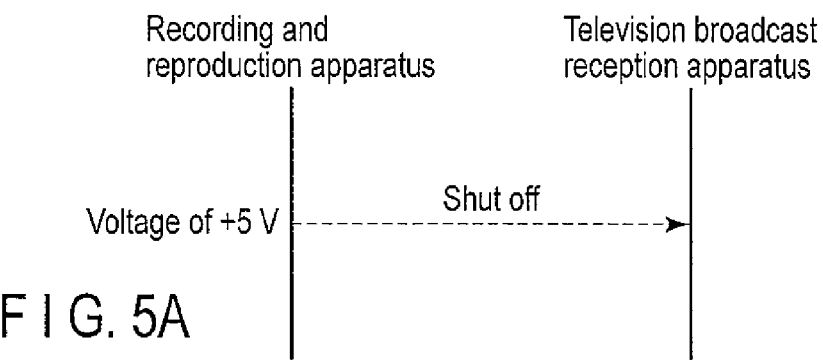
FIGS. 5A and 5B are flowcharts each of which is shown to explain an example of operation in which the television broadcast reception apparatus according to the embodiment stops signal transmission by the USB standard.
Figure 5B:
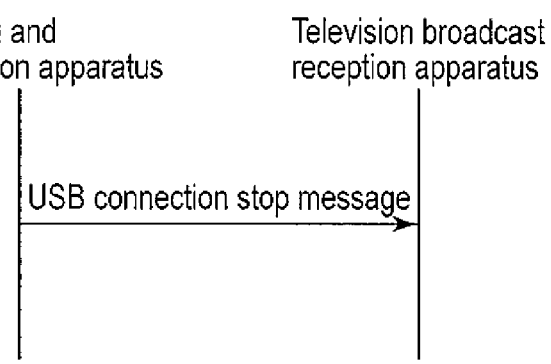

FIGS. 5A and 5B and FIGS. 6A and 6B illustrate examples where the signal transmission based on the USB standard is stopped. First, when the supply of the power supply voltage of +5V from the HDMI transmission module 22 of the recording and reproduction apparatus 11 is lost as shown in FIG. 5A or when the USB connection stop message is supplied from the recording and reproduction apparatus 11 as shown in FIG. 5B, the television broadcast reception apparatus 12 returns the selector 28 to the state in which the HPD line 26c and the Utility line 26d of the HEAC signal control module 26b are selected, and stops the signal transmission based on the USB standard.

Figure 6A:
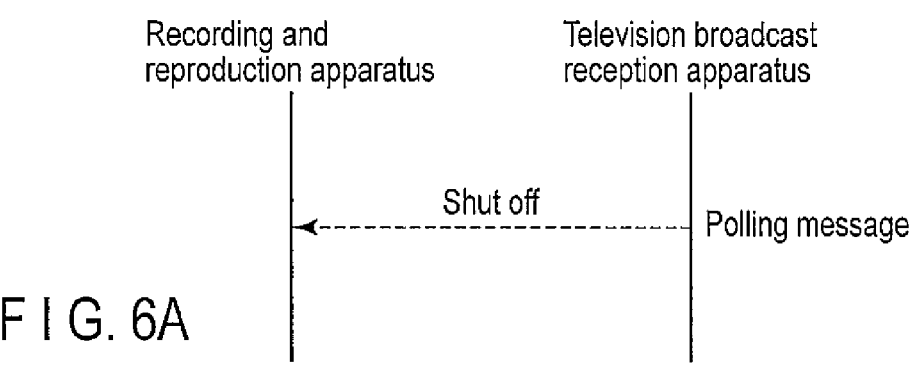
FIGS. 6A and 6B are flowcharts each of which is shown to explain an example of operation in which the recording and reproduction apparatus according to the embodiment stops signal transmission by the USB standard.
Figure 6B:
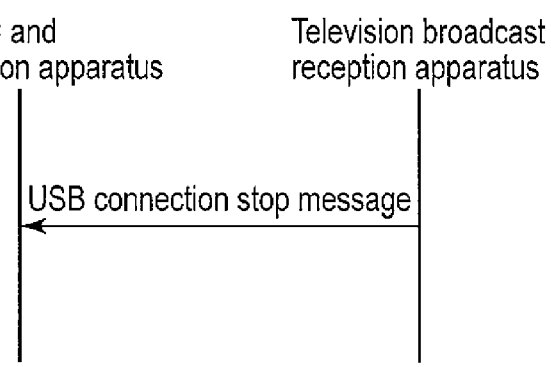

On the other hand, when the polling message from the television broadcast reception apparatus 12 is not received within a defined time as shown in FIG. 6A or when the USB connection stop message is supplied from the television broadcast reception apparatus 12 as shown in FIG. 6B, the recording and reproduction apparatus 11 returns the selector 23 to the state in which the HPD line 22b and the Utility line 22c of the HEAC signal control module 22a are selected, and stops the signal transmission based on the USB standard.

FIG. 7 illustrates an example of frame configuration of the extended CDC signal. Basically, the frame configuration is compatible with the conventional CDC. That is, when the value of the CEC Opcode Block in the second block is (0xFC), the message is treated as the extended message. The inquiry message about the transmission function, the response message indicating the type of transmission function, and messages needed to switch the transmission function such as the polling message are defined in the Extend CDC Opcode in the fifth block, and parameters needed for the respective messages are defined in the Extend CDC Parameters subsequent thereto. In addition, a message concerning control of the signal transmission according to the USB standard is also defined in the Extend CDC Opcode.

According to the above embodiment, the recording and reproduction apparatus 11 serving as the source apparatus transmits an inquiry to the television broadcast reception apparatus 12 serving as the sink apparatus to determine whether the television broadcast reception apparatus 12 has signal transmission means using a method other than the HDMI standard, and when the television broadcast reception apparatus 12 transmits a response indicating that the television broadcast reception apparatus 12 has the signal transmission means using a method other than the HDMI standard (in the case of the above embodiment, the signal transmission means based on the USB standard), the signal transmission based on the USB standard can be performed using the HEAC+ line 13e and the HEAC− line 13f of the HDMI cable 13.

In other words, the transmission of the HEAC signal and the transmission of the signal based on the USB standard can be selectively realized between the recording and reproduction apparatus 11 and the television broadcast reception apparatus 12 using the HEAC+ line 13e and the HEAC− line 13f of the same HDMI cable 13. This enables signal transmission selectively supporting a plurality of types of signal transmission methods including the HDMI standard using the simple configuration without increasing the number of connected cables, the size of area in which the connectors are implemented, and the like, thus enhancing user convenience in handling the signal transmission.

In this case, the signal transmission using the USB standard as the signal transmission means using a method other than the HDMI standard has been explained in the above embodiment. However, the embodiment is not limited thereto. For example, a two-line serial transmission means such as a Universal Asynchronous Receiver Transmitter (UART) may be used.

In this transmission means, a UART host provided in the recording and reproduction apparatus 11 and a UART device provided in the television broadcast reception apparatus 12 have polarities called a transmit line TXD and a receive line RXD. For this reason, it is necessary to make connection to the selectors 23, 28 as shown in FIG. 8.

More specifically, the switch 23a of the selector 23 performs a switching operation such that the HPD line 22b of the HEAC signal control module 22a and the transmit line TXD of the UART host are selectively connected to the HEAC− line 13f of the HDMI cable 13. The switch 23b performs a switching operation such that the Utility line 22c of the HEAC signal control module 22a and the receive line RXDb of the UART host are selectively connected to the HEAC+ line 13e of the HDMI cable 13.

On the other hand, the switch 28a of the selector 28 performs a switching operation such that the HPD line 26c of the HEAC signal control module 26b and the transmit line TXD of the UART device are selectively connected to the HEAC− line 13f of the HDMI cable 13. The switch 28b performs a switching operation such that the Utility line 26d of the HEAC signal control module 26b and the receive line RXD of the UART device are selectively connected to the HEAC+ line 13e of the HDMI cable 13.

In the explanation about the above embodiment, the source apparatus has the host function, and the sink apparatus has the device function. It is to be understood that, conversely, the source apparatus may have the device function and the sink apparatus has the host function.

In the above embodiment, the USB device 30 is provided in the television broadcast reception apparatus 12 serving as the sink. However, the embodiment is not limited thereto. Alternatively, the television broadcast reception apparatus 12 may have a USB connector, and an external USB device may be connected to the connector. In this case, the externally connected USB device may be, for example, a keyboard, a mouse, and a tablet.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transmission apparatus comprising:
   a transmission module configured to output a video signal or an audio signal to a TMDS line of an HDMI cable in a form based on an HDMI standard;
   a controller configured to input and output an HEAC signal according to the HDMI standard;
   a signal transmission module configured to perform signal transmission based on a method other than the HDMI standard; and
   a selection module configured to selectively switch an HEAC line of the HDMI cable to either a state in which the HEAC line of the HDMI cable is used for transmission of the HEAC signal that is input to and output from the controller or a state in which the HEAC line of the HDMI cable is used for transmission of a signal that is input to and output from the signal transmission module.

2. The transmission apparatus of claim 1, further comprising an authentication module configured to output, to a CEC line of the HDMI cable, a signal for inquiry as to whether a signal transmission function according to a method other than the HDMI standard is provided or not, receive a response signal in reply to the inquiry via the CEC line, and control the selection module to perform switching based on an analysis result in the received response signal.

3. The transmission apparatus of claim 2, wherein when the received response signal indicates that the signal transmission function according to the method other than the HDMI standard is provided, the authentication module is configured to switch the selection module to the state in which the HEAC line of the HDMI cable is used for transmission of the signal that is input to and output from the signal transmission module.

4. The transmission apparatus of claim 1, wherein the signal transmission module is configured to include execution of signal transmission according to any one of a method based on USB standard and a two-line serial transmission method.

5. A reception apparatus comprising:
   a reception module configured to input a video signal or an audio signal from a TMDS line of an HDMI cable in a form based on an HDMI standard;
   a controller configured to input and output an HEAC signal according to the HDMI standard;
   a signal transmission module configured to perform signal transmission based on a method other than the HDMI standard; and
   a selection module configured to selectively switch an HEAC line of the HDMI cable to either a state in which the HEAC line of the HDMI cable is used for transmission of the HEAC signal that is input to and output from the controller or a state in which the HEAC line of the HDMI cable is used for transmission of a signal that is input to and output from the signal transmission module.

6. The reception apparatus of claim 5, further comprising an authentication module, wherein when a signal for inquiry as to whether a signal transmission function according to a method other than the HDMI standard is provided or not is received via a CEC line of the HDMI cable, the authentication module is configured to output a response signal in reply to the inquiry via the CEC line, and control the selection module to perform switching based on the output response signal.

7. The reception apparatus of claim 6, wherein when the output response signal indicates that the signal transmission function according to the method other than the HDMI standard is provided, the authentication module is configured to switch the selection module to the state in which the HEAC line of the HDMI cable is used for transmission of the signal that is input to and output from the signal transmission module.

8. The reception apparatus of claim 5, wherein the signal transmission module is configured to include execution of signal transmission according to any one of a method based on USB standard and a two-line serial transmission method.

9. A transmission method comprising:
   causing a transmission apparatus to output a video signal or an audio signal to a TMDS line of an HDMI cable in a form based on an HDMI standard;
   causing a reception apparatus to recover the video signal or the audio signal that is output to the TMDS line;
   causing the transmission apparatus to output, to a CEC line of the HDMI cable, a signal for inquiry as to whether a signal transmission function according to a method other than the HDMI standard is provided or not;
   causing the reception apparatus to output, to the CEC line, a response signal in reply to the inquiry signal that is output to the CEC line;
   causing the transmission apparatus and the reception apparatus to selectively switch, based on the response signal, an HEAC line of the HDMI cable to either a state in which the HEAC line of the HDMI cable is used for transmission of the HEAC signal according to the HDMI standard or a state in which the HEAC line of the HDMI cable is used for transmission of a signal based on a method other than the HDMI standard.

* * * * *